United States Patent
Reiner et al.

(10) Patent No.: US 11,055,303 B2
(45) Date of Patent: Jul. 6, 2021

(54) INGESTION MANAGER FOR ANALYTICS PLATFORM

(71) Applicants: EMC Corporation, Hopkinton, MA (US); EMC IP Holding Company LLC, Hopkinton, MA (US)

(72) Inventors: David Stephen Reiner, Lexington, MA (US); Nihar Nanda, Acton, MA (US); Timothy Bruce, Carrollton, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 636 days.

(21) Appl. No.: 15/197,072

(22) Filed: Jun. 29, 2016

(65) Prior Publication Data

US 2018/0004826 A1 Jan. 4, 2018

(51) Int. Cl.
*G06F 16/25* (2019.01)
*G06F 16/28* (2019.01)
*G06F 16/90* (2019.01)

(52) U.S. Cl.
CPC ............ *G06F 16/25* (2019.01); *G06F 16/28* (2019.01); *G06F 16/90* (2019.01)

(58) Field of Classification Search
CPC ......... G06F 17/30557; G06F 17/30587; G06F 17/30943; G06F 16/25; G06F 16/28; G06F 16/90

(Continued)

(56) References Cited

U.S. PATENT DOCUMENTS 8,838,556 B1 9/2014 Reiner et al.
8,972,465 B1 * 3/2015 Faibish .................. G06F 16/13
707/822

(Continued)

FOREIGN PATENT DOCUMENTS

WO 2011130128 A1 10/2011
WO PCT/US2017/037831 9/2017

OTHER PUBLICATIONS

U.S. Appl. No. 14/487,520 filed in the name of Nihar Nanda et al. on Sep. 16, 2014 and entitled "Data Set Virtual Neighborhood Characterization, Provisioning and Access."

(Continued)

*Primary Examiner* — Brittany N Allen
*Assistant Examiner* — Jessica N Le
(74) *Attorney, Agent, or Firm* — Ryan, Mason & Lewis, LLP

(57) ABSTRACT

An apparatus in one embodiment comprises an ingestion manager, a plurality of ingestion engines associated with the ingestion manager, and an analytics platform configured to receive data from the ingestion engines under the control of the ingestion manager. The ingestion manager is configured to interact with one or more of the ingestion engines in conjunction with providing data to a given one of a plurality of analytics workspaces of the analytics platform. For example, the analytics workspaces of the analytics platform are illustratively configured to receive data from respective potentially disjoint subsets of the ingestion engines under the control of the ingestion manager. Additionally or alternatively, the ingestion manager may be configured to implement data-as-a-service functionality for one or more of the analytics workspaces of the analytics platform.

21 Claims, 5 Drawing Sheets

(58) Field of Classification Search
USPC .......................................................... 707/705
See application file for complete search history.

(56) References Cited

U.S. PATENT DOCUMENTS

| | | | |
|---|---|---|---|
| 9,141,908 | B1 | 9/2015 | Reiner et al. |
| 9,235,630 | B1* | 1/2016 | Dietrich .................. G06F 16/25 |
| 10,078,537 | B1* | 9/2018 | Nanda ................... G06F 16/188 |
| 2007/0276676 | A1* | 11/2007 | Hoenig .................. G06Q 30/02 705/319 |
| 2010/0114899 | A1 | 5/2010 | Guha et al. |
| 2011/0066590 | A1 | 3/2011 | Chang et al. |
| 2011/0077958 | A1* | 3/2011 | Breitenstein ........... G06Q 10/10 705/2 |
| 2011/0077973 | A1 | 3/2011 | Breitenstein et al. |
| 2011/0225232 | A1* | 9/2011 | Casalaina ................ H04L 41/22 709/203 |
| 2012/0136806 | A1 | 5/2012 | Anderson et al. |
| 2014/0075506 | A1* | 3/2014 | Davis .................. H04L 63/0209 726/3 |
| 2014/0258250 | A1 | 9/2014 | Ge et al. |
| 2014/0330745 | A1* | 11/2014 | Hampapur ........... G06Q 10/067 705/348 |
| 2014/0358975 | A1 | 12/2014 | Nivargi et al. |
| 2015/0227702 | A1* | 8/2015 | Krishna ................ G06F 19/321 705/2 |
| 2015/0281356 | A1 | 10/2015 | Maturana et al. |
| 2016/0014159 | A1* | 1/2016 | Schrecker ............. H04L 63/105 726/1 |
| 2016/0019272 | A1 | 1/2016 | Liu et al. |
| 2016/0077926 | A1* | 3/2016 | Mutalik .............. G06F 11/1456 711/162 |
| 2016/0134616 | A1* | 5/2016 | Koushik .................. H04L 63/08 726/9 |
| 2016/0162478 | A1* | 6/2016 | Blassin ............ G06Q 10/06311 706/12 |
| 2016/0291959 | A1* | 10/2016 | Searle ................... H04L 41/082 |
| 2016/0321034 | A1* | 11/2016 | Yen ........................... G06F 8/20 |
| 2017/0251003 | A1* | 8/2017 | Rostami-Hesarsorkh .................. H04L 63/1425 |
| 2017/0324813 | A1* | 11/2017 | Jain ....................... G06F 9/5016 |
| 2017/0364703 | A1* | 12/2017 | Jacob .................... G06F 16/178 |
| 2018/0011739 | A1* | 1/2018 | Pothula .............. G06Q 10/0633 |
| 2018/0084073 | A1* | 3/2018 | Walsh ................. H04L 67/2819 |

OTHER PUBLICATIONS

E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

Ey.Com, "Forensic Data Analytics: Globally Integrated Compliance Review, Litigation Support and Investigative Services," http://www.ey.com/Publication/vwLUAssets/EY-Forensic-data-analytics/$FILE/EY-Forensic-data-analytics. pdf, 2013, 12 pages.

Philip Russom, "Active Data Archiving: For Big Data, Compliance, and Analytics," TDWI Research, TDWI Checklist Report, http://rainstorcom/2013_new/wp-content/uploads/2014/11/WP_TDWI_ChecklistReport_Rainstor_Active-Data-Archiving.pdf, May 2014, 8 pages.

Booz Allen Hamilton, "Data Lake-Based Approaches to Regulatory-Driven Technology Challenges: How a Data Lake Approach Improves Accuracy and Cost Effectiveness in the Extract, Transform, and Load Process for Business and Regulatory Purposes," http://www.boozallen.com/content/dam/boozallen/media/file/data-lake-based-approaches-to-regulatory-driven-tech-changes.pdf, Apr. 2013, 6 pages.

Mike Ferguson, "Architecting a Big Data Platform for Analytics," White Paper, Intelligent Business Strategies, Oct. 2012, 36 pages.

Joe Nicholson, "Beyond BI: Big Data Analytic Use Cases," Datameer, Aug. 22, 2013, 7 pages.

U.S. Appl. No. 14/614,011 filed in the name of David Stephen Reiner et al. on Feb. 4, 2015 and entitled "Integrating Compliance and Analytic Environments Through Data Lake Cross Currents."

U.S. Appl. No. 15/074,597 filed in the name of David Stephen Reiner et al. on Mar. 18, 2016 and entitled "Data Set Discovery Engine Comprising Relativistic Retriever."

U.S. Appl. No. 15/088,029 filed in the name of David Reiner et al. on Mar. 31, 2016 and entitled "A Registration Framework for an Analytics Platform."

U.S. Appl. No. 15/088,085 filed in the name of David Reiner et al. on Mar. 31, 2016 and entitled "Data Governance Through Policies and Attributes."

* cited by examiner

INGESTION MANAGER FOR ANALYTICS PLATFORM

FIELD

The field relates generally to information processing systems, and more particularly to data ingestion in information processing systems.

BACKGROUND

Many different types of information processing systems are configured to incorporate data analytics functionality. For example, numerous systems configured to perform "Big Data" analytics are known in the art. However, issues can arise in some of these systems relating to ingestion of data from multiple distinct data sources.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments of the invention can include, without limitation, apparatus, systems, methods, and computer program products comprising processor-readable storage media.

Figure 1:
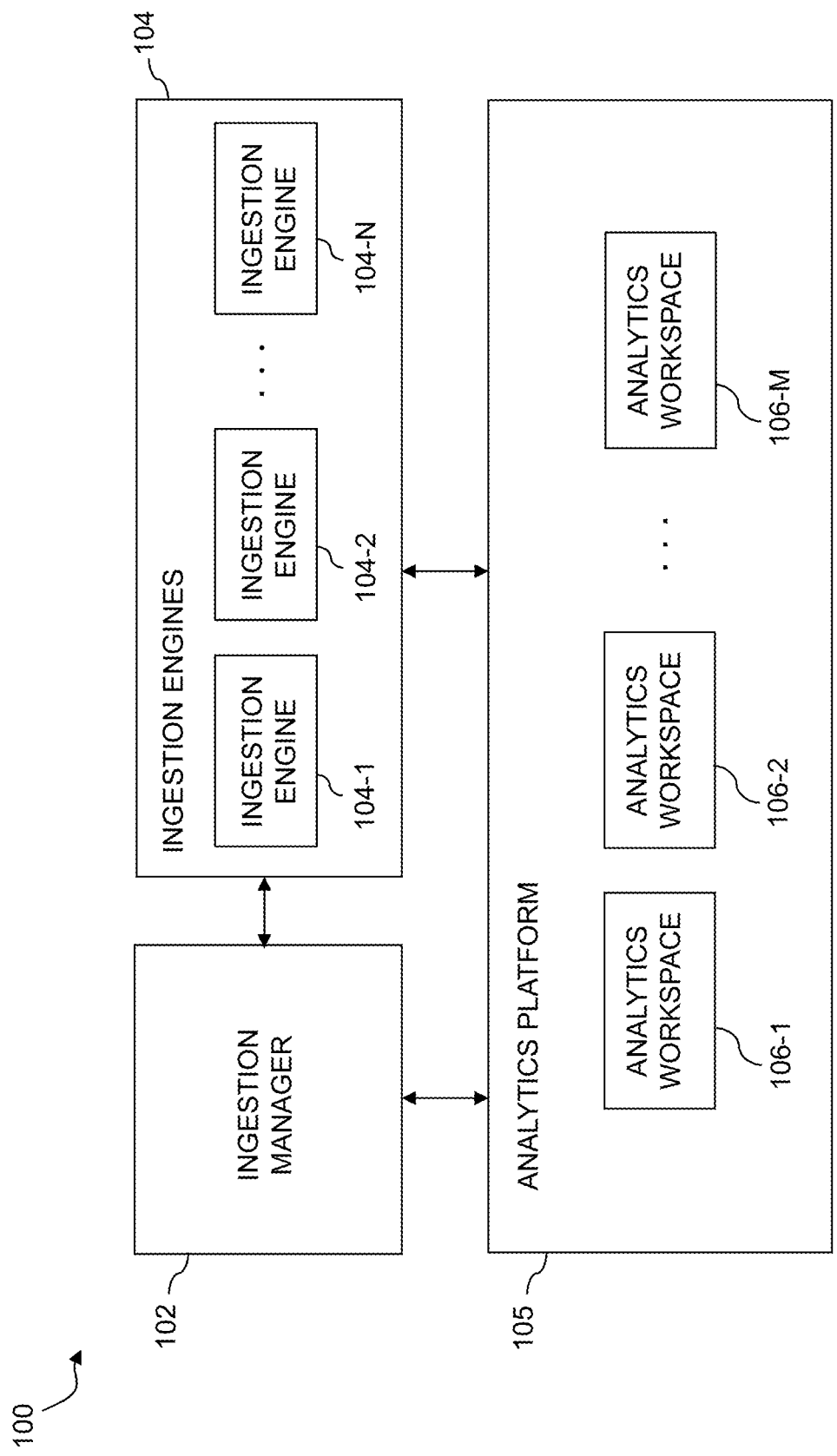
FIG. 1 is a block diagram of an information processing system comprising an ingestion manager controlling multiple distinct ingestion engines for an analytics platform in an illustrative embodiment of the invention.

FIG. 1 shows an information processing system 100 configured in accordance with an illustrative embodiment of the present invention. The information processing system 100 is assumed to be built on at least one processing platform and provides functionality for data ingestion management for at least one analytics platform. In this embodiment, the system 100 more particularly comprises an ingestion manager 102, a plurality of ingestion engines 104-1, 104-2, ... 104-N coupled to or otherwise associated with the ingestion manager 102, and an analytics platform 105 configured to receive data from the ingestion engines 104 under the control of the ingestion manager 102. The analytics platform 105 comprises a plurality of analytics workspaces 106-1, 106-2, ... 106-M. The ingestion manager 102 is illustratively configured to select one or more of the ingestion engines 104 for providing data to a given one of the analytics workspaces 106 of the analytics platform 105.

By way of example, in some implementations, two or more of the analytics workspaces 106 of the analytics platform 105 are configured to receive data from respective potentially disjoint subsets of the ingestion engines 104 under the control of the ingestion manager 102. Such functionality is illustratively provided using a data-as-a-service model, although other types of data delivery models can be used.

The ingestion manager 102 is illustratively configured to select one or more of the ingestion engines 104 for providing data to a given one of the analytics workspaces 106 of the analytics platform 105 based at least in part on factors such as data type, data volume, data latency, intended usage, and service level agreement (SLA) requirements.

The ingestion manager 102 is further configured to maintain historical information relating to data usage in one or more of the analytics workspaces 106 of the analytics platform 105 and to adjust selection of one or more of the ingestion engines 104 for providing data to those analytics workspaces 106 based at least in part on the historical information.

Numerous other types of additional or alternative data ingestion management functionality can be provided by the ingestion manager 102 in illustrative embodiments.

For example, the ingestion manager 102 in some embodiments is configured to monitor usage of ingested data in a given one of the analytics workspaces 106 of the analytics platform 105, to identify related data responsive to the monitoring, and to control ingestion of the related data by the given analytics workspace. The related data in some cases may be external to the analytics platform 105, or may have been ingested previously into a different one of the analytics workspaces 106 or an associated data container. Controlling the ingestion of related data may include, for example, first suggesting the ingestion, and then orchestrating the ingestion if the suggestion is approved.

As another example, the ingestion manager 102 in some embodiments is configured to permit two or more of the analytics workspaces 106 to register to receive data from respective potentially disjoint subsets of the ingestion engines 104.

As a further example, the ingestion manager 102 in some embodiments is configured to control the ingestion of data into operational data containers (ODCs) that are accessible to each of at least a subset of the analytics workspaces 106 of the analytics platform 105.

Additionally or alternatively, the ingestion manager 102 can be configured to ensure compliance with SLAs for data ingestion on behalf of one or more of the analytics workspaces 106 of the analytics platform 105. For example, the ingestion manager can be configured to ensure compliance with an SLA requiring that operational sales data be ingested from particular sales data sources within 15 minutes of its initial availability from those sources, throughout a given business day.

Numerous additional examples of ingestion management functionality in illustrative embodiments will be provided elsewhere herein.

The ingestion manager 102 can be configured to control a wide variety of different modes of data ingestion from the ingestion engines 104, including, for example, ingestion of arriving data batches ("bulk ingest"), ingestion of arriving data streams ("near-real-time"), ingestion of historical data ("catch-up"), and ingestion of updates to existing data sets ("changes only," often referred to as change data capture (CDC)). Data and metadata may be indexed in place within storage systems or other parts of the system 100 before or in conjunction with ingestion. Also, availability of ingested data can be published in order to facilitate data distribution, potentially in a self-service manner, within the system 100.

The data ingestion engines 104 can be configured to ingest data from numerous different types of data sources, including, for example, relational database management systems, distributed NoSQL systems, event streams, log files and many others. Data may be delivered from the data sources to the ingestion engines 104 utilizing a wide variety of different types of data transport mechanisms, including, for example, file copies over HTTP or SFTP, JDBC, REST, Kafka, Flume, and vendor-specific interfaces.

Although the ingestion manager 102 and its associated ingestion engines 104 are shown in the FIG. 1 embodiment as being separate from the analytics platform 105, in some embodiments one or more of the ingestion manager 102 and the ingestion engines 104 can be implemented at least in part within the analytics platform 105. Also, it is possible that at least portions of the ingestion engines 104 can be incorporated into the ingestion manager 102, or vice-versa. For example, the ingestion manager 102 can comprise multiple integrated ingestion engines 104. As another example, a distributed implementation of the ingestion manager 102 can comprise one or more ingestion management modules implemented on respective ones of the ingestion engines 104.

The term "analytics platform" as used herein is intended to be broadly construed, so as to encompass a wide variety of different processing environments involving data analysis, including cloud-based environments. The term "analytics workspace" is similarly intended to be broadly construed, so as to encompass a wide variety of different types of workspaces, including, for example, various types of areas, sandboxes and other spaces utilized at least in part for data analysis, as well as other types of workspaces such as application development workspaces of an application development environment. Also, an entire analytics platform in some embodiments can itself be viewed as an analytics workspace in the absence of particular defined analytics workspaces.

In some embodiments, the analytics platform 105 comprises at least one data lake, such as a business data lake or BDL.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

A wide variety of different use cases of the system 100 can be supported based on implementation-specific factors such as the data types being ingested, the volume of data being ingested, the intended use of the ingested data, and the ingestion management functionality desired in a given application. For example, a given embodiment can be configured to ingest and analyze voicemail messages in a real-time surveillance application. Another embodiment can be configured to provide an analytic sandbox for data exploration and clustering model development.

It is to be appreciated that the particular arrangement of system components illustrated in FIG. 1 is exemplary only, and that numerous other arrangements of components may be used in other embodiments.

The system 100 may therefore include additional or alternative components not explicitly shown in the figure. For example, one or more user terminals each having a graphical user interface (GUI) may be associated with the ingestion manager 102 or analytics platform 105 in order to support user control of at least portions of the data ingestion management functionality or the data analytics functionality of the system. Such user terminals can comprise, for example, desktop, laptop or tablet computers, mobile telephones, or other types of processing devices capable of communicating with the ingestion manager 102 or analytics platform 105 over at least one network.

Moreover, the particular arrangement of ingestion manager 102, ingestion engines 104, analytics platform 105 and analytics workspaces 106 in the FIG. 1 embodiment is illustrative only, and can be varied in other embodiments.

For example, one or more of the ingestion engines 104 can be configured to include at least a subset of the ingestion management functionality described herein, so as to manage multiple additional ingestion engines under its control. These and other hierarchical arrangements can include multiple levels each having one or more ingestion managers and possibly one or more ingestion engines. A given one of the ingestion engines 104 can additionally or alternatively be configured to manage certain aspects of its own functionality, such as monitoring progress for a user.

In some embodiments, the analytics platform 105 is replaced with or augmented with another type of processing environment that can benefit from controlled ingestion of data from multiple ingestion engines. For example, an ingestion manager of the type disclosed herein can be configured in other embodiments to control ingestion of data from ingestion engines to multiple application development workspaces of an application development environment, to a stream processing platform for sensor data, or to another type of processing environment.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 4 and 5.

Figure 2:
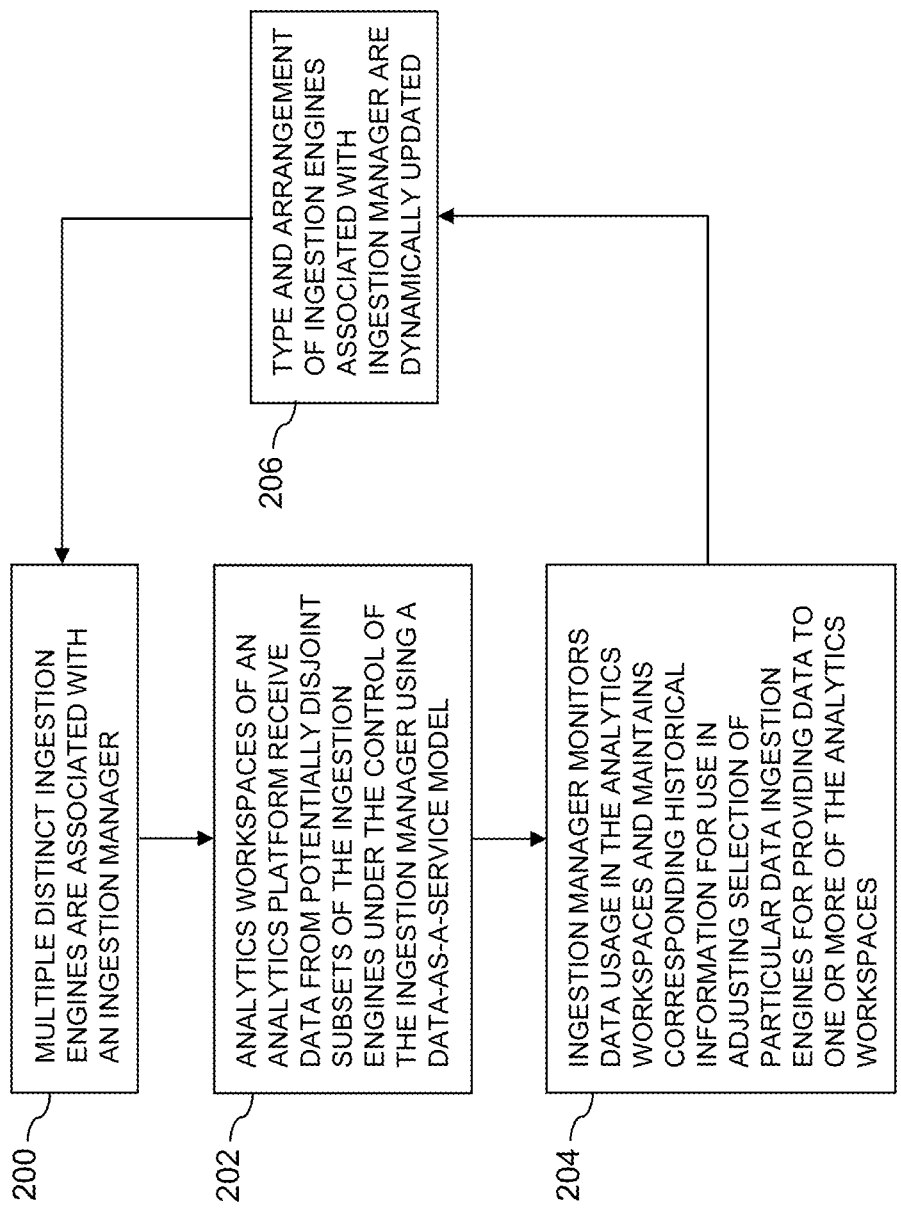
FIG. 2 is a flow diagram of an example process for managing ingestion from multiple distinct ingestion engines into an analytics platform in an illustrative embodiment.

FIG. 2 shows a flow diagram of an example process for managing data ingestion from multiple distinct ingestion engines into an analytics platform. The process is illustratively performed by ingestion manager 102 operating in conjunction with other system components such as ingestion engines 104, analytics platform 105 and analytics workspaces 106 of system 100, but could be performed by numerous other types of systems. The process as shown includes steps 200, 202, 204 and 206, although wide variety of additional or alternative data ingestion management processes can be used in other embodiments.

In step 200, multiple distinct ingestion engines are associated with an ingestion manager. In the context of the FIG. 1 embodiment, the ingestion engines 104 are coupled to or otherwise associated with the ingestion manager 102. For example, the ingestion manager 102 and the ingestion engines 104 may be implemented on a common processing platform and associated with one another by that common implementation configuration. Numerous other types of associations can be used to provide the ingestion manager 102 with an ability to control certain data ingestion functionality of the ingestion engines 104. Also, in other embodiments, there may be only a single ingestion engine associated with the ingestion manager.

It should be noted in this regard that the term "data" as used herein in the context of data ingestion is intended to be broadly construed. Such data in some embodiments illustratively comprises arrangements that are referred to herein as "data sets." These data sets may comprise respective abstractions each representing a collection of similarly-structured data.

For example, a "data set" as the term is broadly used herein may be viewed, for example, as an abstraction of one or more data items, such as a table, document, file, query result, set of key-value pairs, index, storage block contents, in-memory caches or other data items or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others.

Other examples of data sets that can be utilized in illustrative embodiments are shown in the Appendix. It should be noted that some of these data set characterizations may overlap. For example, a set of key-value pairs may be stored as a file.

Additional details regarding exemplary data sets and metadata characterizing those data sets, as well as techniques for reasoning over such metadata and possibly also corresponding data set content, can be found in U.S. Pat. No. 8,838,556, entitled "Managing Data Sets by Reasoning over Captured Metadata," U.S. Pat. No. 9,141,908, entitled "Dynamic Information Assembly for Designated Purpose based on Suitability Reasoning over Metadata," and U.S. patent application Ser. No. 14/487,520, filed Sep. 16, 2014 and entitled "Data Set Virtual Neighborhood Characterization, Provisioning and Access," all of which are commonly assigned herewith and incorporated by reference herein. It is to be appreciated, however, that such data sets and reasoning techniques are considered examples only, and need not be utilized in other embodiments.

In step 202, analytics workspaces of an analytics platform receive data from potentially disjoint subsets of the ingestion engines under the control of the ingestion manager using a data-as-a-service model. For example, the data-as-a-service model can be used to access ingested data in a given analytics workspace. Additionally or alternatively, the data-as-a-service model can be used to access, from a given analytics workspace, a data source that may itself not have been ingested into the workspace. Numerous other arrangements or combinations of such arrangements are possible. Also, although this step makes reference to a data-as-a-service model, other types of data delivery models can be used, as previously indicated herein.

As one example of an implementation of step 202 in the context of the FIG. 1 embodiment, the ingestion manager 102 can select a first subset of the ingestion engines 104 to provide data to a first one of the analytics workspaces 106, and a second subset of the ingestion engines 104 different than the first subset to provide data to a second one of the analytics workspaces 106. Each of the analytics workspaces 106 may therefore receive data from a different subset of the ingestion engines 104 under the control of the ingestion manager 102.

Thus, some implementations of step 202 involve the ingestion manager selecting one or more of the ingestion engines for providing data to a given one of the analytics workspaces of the analytics platform. In such implementations, the ingestion manager can be more particularly configured to select the one or more ingestion engines for providing data to the given analytics workspace of the analytics platform based at least in part on one or more of data type, data volume, data latency, intended usage, and SLA requirements. Additional or alternative factors can be utilized in the selection process in other embodiments.

Data provided to one of the analytics workspaces by a given one of the ingestion engines under the control of the ingestion manager is utilized in that workspace, for example, by a human user or by an automated or partially-automated tool.

Ingestion engines subject to selection by an ingestion manager may be required in some embodiments to register with the ingestion manager or otherwise provide the ingestion manager with details enabling ingestion engine management before being considered candidates for such selection.

The ingestion manager in the FIG. 2 process can be configured to permit the analytics workspaces to register to receive data from respective potentially disjoint subsets of the ingestion engines. Such registration in some embodiments is illustratively implemented at the data source or data set level, possibly in conjunction with a subscribe operation of a publish-subscribe data access model.

In some embodiments, the selection of one or more of the ingestion engines for providing data to a given analytics workspace is based at least in part on data transformation or data quality improvement capabilities of the one or more ingestion engines. Accordingly, ingestion engines can be configured to perform data transformations or data quality improvement as part of ingestion, and may be selected based at least in part on their ability to do so.

The ingestion manager is illustratively configured to orchestrate one or more characteristics of a data ingestion process implemented by at least one of the ingestion engines. For example, this may involve transmitting, logging, or otherwise acting on alerts or errors encountered or generated by an ingestion engine. As another example, ingestion manager orchestration of an ingestion process implemented by an ingestion engine may include restarting ingestion, or possibly re-ingesting some portion of the data source.

The ingestion manager can also be configured to provide one or more data ingestion functions not provided by one or more of the ingestion engines, thereby augmenting the capabilities of the ingestion engines. For example, if a given ingestion engine cannot perform joins of relational tables being ingested simultaneously from related sources, the ingestion manager may be configured to provide join processing layered on top of the capabilities of the given ingestion engine.

The ingestion manager in some embodiments can be configured to control the ingestion of data into ODCs that are accessible to each of at least a subset of the analytics workspaces of the analytics platform. Such ODCs can be illustratively implemented in the form of what are also referred to as "staging areas" or "landing zones." The use of these and other types of ODCs can advantageously optimize ingestion and minimize re-ingestion into the analytics workspaces of the analytics platform. In some embodiments, ODCs are shared between multiple users and implemented using data stores based at least in part on known technologies such as HDFS, MongoDB, MySQL, Hive, etc.

In step 204, the ingestion manager monitors data usage in the analytics workspaces and maintains corresponding historical information for use in adjusting selection of particular data ingestion engines for providing data to one or more of the analytics workspaces. Such an arrangement can be configured to leverage history and user acceptance of historical ingestion engine selection and ingestion results to optimize, adjust, tune and reinforce ingestion engine selections and configurations. In some embodiments this may involve use of internal or external principle component analysis or machine learning.

Other types of monitoring can be used in other embodiments. For example, the ingestion manager may be configured to monitor usage of ingested data in a given analytics workspace of the analytics platform, to identify related data responsive to the monitoring, and to control ingestion of the related data by the given analytics workspace.

In step 206, the type and arrangement of ingestion engines associated with the ingestion manager are dynamically updated. The process is then repeated utilizing the updated type and arrangement of ingestion engines. It should be noted that the updating step 206 is optional and can be eliminated in other embodiments, although this optionally should not be construed as an indication that any other particular step is required.

As indicated above, the FIG. 2 process can include additional or alternative steps not explicitly shown in the figure.

For example, other implementations of the process can incorporate other types of interaction between the ingestion manager and its associated ingestion engines in conjunction with providing data to analytics workspaces of an analytics platform.

The ingestion manager can perform other types of ingestion management operations, such as ensuring compliance with SLAs for data ingestion on behalf of one or more of the analytics workspaces of the analytics platform, controlling enforcement of one or more specified policies relating to ingestion of data on behalf of one or more of the analytics workspace of the analytics platform, or auditing placement of data received by one or more of the analytics workspaces of the analytics platform from the ingestion engines.

In some embodiments, policy enforcement occurs at least in part within an ingestion engine, under the control of the ingestion manager. For example, the ingestion manager may delegate policy enforcement to an ingestion manager. As a more particular example, the ingestion manager may delegate enforcement of a data quality policy to an ingestion engine. It is also possible that the ingestion engines may enforce additional policies of which the ingestion manager may not be aware.

Additionally or alternatively, the ingestion manager in some embodiments is configured to identify relationships between ingested data sets and to create linkages between the data sets based at least in part on the identified relationships. Such an embodiment can make use of functionality similar to that of illustrative embodiments of a relativistic retriever of the type disclosed in U.S. patent application Ser. No. 15/074,597, filed Mar. 18, 2016 and entitled "Data Set Discovery Engine Comprising Relativistic Retriever," which is commonly assigned herewith and incorporated by reference herein.

These relativistic retriever techniques can also be applied by the ingestion manager or one or more of the ingestion engines to identify one or more similar data sets relative to a given ingested data set and to control ingestion of the identified similar data sets. This can include, for example, re-ingestion of a newer version of previously-ingested data sets.

In some embodiments, a given ingestion engine, whether or not it is registered to the ingestion manager, can ingest data that is then "discovered" by the ingestion manager after the fact. At such a point, the ingestion manager can take steps to bring the data into the purview of the analytics platform. For example, it can scrape metadata describing the ingested data from a log of the ingestion engine and add the metadata to an asset registry. Such an arrangement may be viewed as a type of "pull" model from the perspective of the ingestion manager.

The particular processing operations and other system functionality described in conjunction with the flow diagram of FIG. 2 are presented by way of illustrative example only, and should not be construed as limiting the scope of the invention in any way. Alternative embodiments can use other types of processing operations for managing data ingestion by analytics workspaces of an analytics platform. For example, the ordering of the process steps may be varied in other embodiments, or certain steps may be performed at least in part concurrently with one another rather than serially.

It should be understood that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

Example implementations of the FIG. 2 process illustratively include at least a subset of the following ingestion management operations:

1. Discovering data sources and data sets within them;
2. Classifying data sets to determine licensing, toxicity, risk, constraints, relevance;
3. Enforcing enterprise ingestion policies;
4. Connecting to data sources of different types and by various protocols;
5. Extracting, staging and splitting data to prepare for ingestion;
6. Transforming structure or content, including digitizing, partitioning, compressing, filtering, deduplicating, encrypting, tokenizing, and masking (may be schema-on-read, schema-on-write, or mixed);

7. Enriching and augmenting data with derived metadata, tags, marks, scores, and context;

8. Analyzing and extracting domain-specific entities, phonetic units, aggregates, and other derived data;

9. Ensuring data and metadata quality;

10. Generating (potentially real-time) notifications and alerts, and routing data;

11. Indexing to support later search and access (indexing in place is not considered ingestion);

12. Linking newly-ingested data to related data (including dealing with variations and conflicts);

13. Copying or moving data and/or metadata;

14. Archiving for compliance;

15. Verifying security policies and establishing access entitlements for ingested data;

16. Protecting ingested data;

17. Logging ingestion history;

18. Monitoring and remediating ingestion SLAs;

19. Auditing data placement, movement and chain-of-custody;

20. Publishing the availability of the ingested data;

21. Automating the workflow of one or more of the above ingestion operations; and 22. Eventually, disposing of ingested data in accordance with policies.

It is to be appreciated that these are just examples of ingestion management operations that can be performed by an ingestion manager in illustrative embodiments. The particular operations applied in a given embodiment can vary in their number and ordering as appropriate to the particular analytics context.

Figure 3:
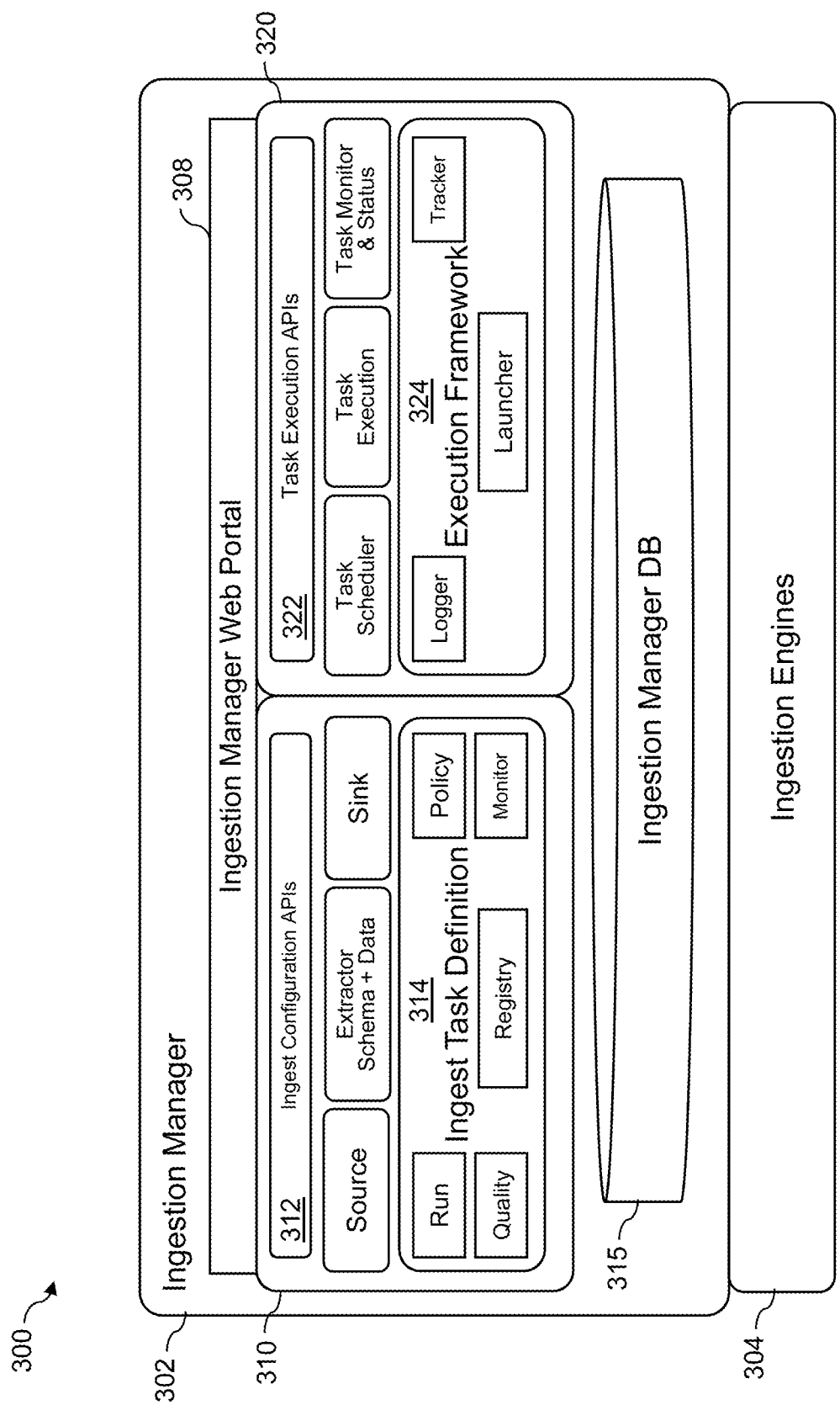
FIG. 3 shows a more detailed view of an ingestion manager for an analytics platform in an illustrative embodiment.

Another illustrative embodiment will now be described with reference to FIG. 3. In this embodiment, an information processing system 300 comprises an ingestion manager 302 and a set of ingestion engines 304 coupled to or otherwise associated with the ingestion manager 302. The ingestion manager 302 further comprises an ingestion manager web portal 308 illustratively providing web-based user access to first and second sets of components 310 and 320. The first and second sets of components 310 and 320 are configured to share an underlying ingestion manager database (DB) 315.

The first set of components 310 comprises a set of ingest configuration application programming interfaces (APIs) 312 as well as associated source, sink and extractor elements. The extractor element is illustratively configured to deal with both schemas and data. An ingest task definition component 314 includes a registry element as well as run, quality, policy and monitor elements.

The second set of components 320 comprises a set of task execution APIs 322 as well as associated elements for task scheduling, execution, monitoring and status. An execution framework 324 includes a launcher element as well as logger and tracker elements.

The ingestion manager 302 is illustratively configured to implement at least a subset of the example ingestion management operations listed above. As in other embodiments herein, the particular components of the FIG. 3 embodiment are provided by way of illustrative example only, and should not be viewed as limiting in any way.

Illustrative embodiments can be configured to provide a number of significant advantages relative to conventional arrangements.

For example, one or more of these embodiments provides an ingestion manager that is configured to control ingestion of structured and unstructured data sets from selected ones of multiple ingestion engines into analytics workspaces of an analytics platform in a particularly efficient and effective manner, thereby enhancing the data analytics performance capabilities and agility of the overall system. Such an arrangement can provide numerous ingestion management services that are separate from but enhance the data ingestion capabilities of the associated ingestion engines. A wide variety of different types of data sets can be delivered into analytics workspaces of the analytics platform using numerous distinct ingestion modes and ingestion frequencies as required for a given implementation or for diverse analytic goals.

Illustrative embodiments are configured to operate with an analytics platform comprising a data lake, and can support features such as, for example, standardized metadata, data formats and directory layouts; a standardized catalog of lightweight transforms for functions such as security and privacy filtering, schema evolution, and type conversion; data quality measurements and enforcement mechanisms such as schema validation, data tagging, and data audits; and scalable ingestion processes with auto-scaling and fault-tolerance functionality.

Other advantages of one or more embodiments include ease of use through centralized monitoring and enforcement in conjunction with automated and controlled on-boarding of data sets from multiple ingestion engines. Such an arrangement minimizes user involvement in the data ingestion process, thereby improving agility, decreasing data latency, and significantly reducing costs.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as the information processing system 300 of FIG. 3.

Figure 4:
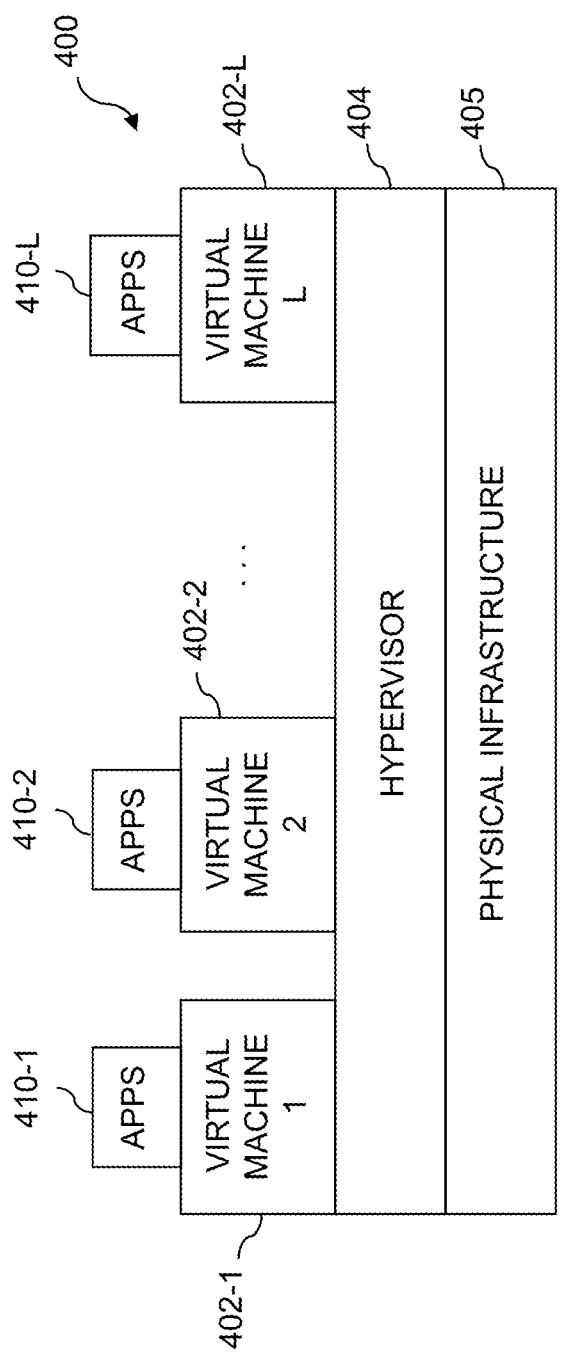
FIGS. 4 and 5 show examples of processing platforms that may be utilized to implement at least a portion of an information processing system in illustrative embodiments.
Figure 5:
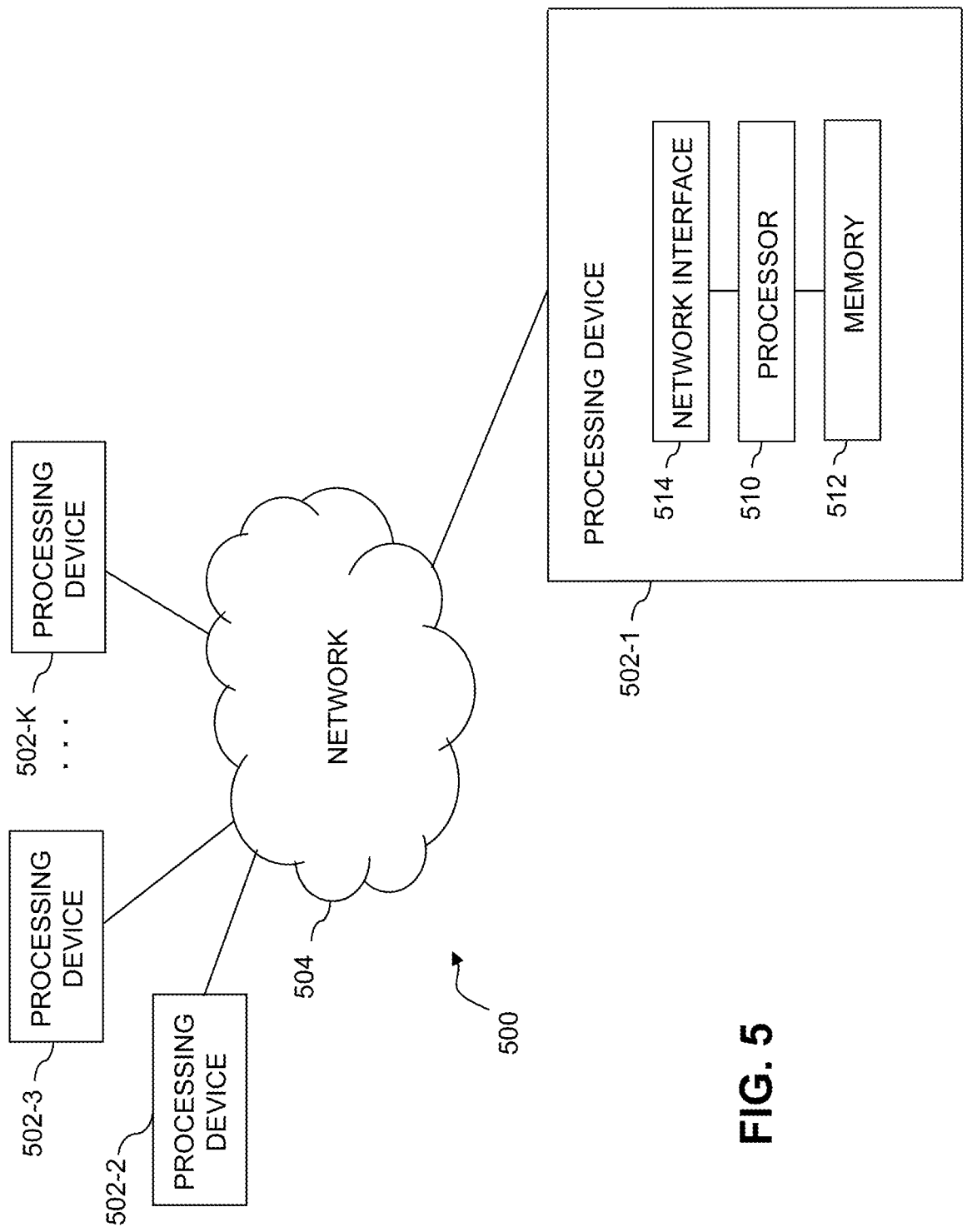

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platforms Division of EMC Corporation.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide controlled data ingestion using multiple distinct ingestion engines. Also, the particular configurations of system and device elements shown in the figures can be varied in other embodiments. Thus, for example, the particular type of ingestion engines, ingestion managers, processing environments, workspaces and other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

APPENDIX: DATA SET EXAMPLES

| Data Set Structure | Examples |
|---|---|
| Relational table | Customers, Employees, Transactions, Resource access history, Time series summary |
| File | Flat file, Audio recording, Photo, Process output file, Log file, Hadoop file, BLOB (Binary Large Object) |
| Key-Value pairs | Twitter hash tag counts, Diagnosis codes, Sensor data, Index, Cache |
| Stream of elements | Market ticks, Surveillance video, Messages, RFIDs, Sensor data |
| Graph | Employee skills, Transit routing, Network assets, Access permissions, Web browsing behavior, Gene sequences, Social media influence, Recommendation engine internals |
| Query or search result | Emails from an archive, Medical test results, Current product suppliers, Product pricing at a given time |
| Document | MongoDB document, XML document, RSS feed, Financial results (XBRL), Website content |
| Report | Sales by region, Top blog topics in last 24 hours, A-B Marketing test results |
| Web Service | Customer discount by volume, Shipment tracking |
| Index | Content index, Federated content index |

What is claimed is:

1. An apparatus comprising:
an ingestion manager;
a plurality of ingestion engines associated with the ingestion manager; and
an analytics platform configured to receive data from the ingestion engines under the control of the ingestion manager, the analytics platform comprising a plurality of analytics workspaces;
wherein the ingestion manager is configured to interact with one or more of the ingestion engines in conjunction with providing data to the plurality of analytics workspaces of the analytics platform;
wherein the ingestion manager is configured to select different subsets of the ingestion engines for providing data to different ones of the analytics workspaces, and to automatically modify its selection of one or more of the subsets of the ingestion engines selected for use with the different ones of the analytics workspaces based at least in part on monitored usage of data in those analytics workspaces;
wherein the ingestion manager selects a first subset of the plurality of ingestion engines for providing data to a first one of the analytics workspaces and selects a second subset of the plurality of ingestion engines for providing data to a second one of the analytics workspaces, the second subset being different than the first subset;
wherein the ingestion manager further implements a processing layer that augments at least one designated ingestion process of a selected one of the ingestion engines relating to ingestion of data into a corresponding one of the analytics workspaces from multiple related sources;
wherein the ingestion manager comprises an ingestion manager web portal providing web-based user access to:
  (i) one or more ingest configuration application programming interfaces for accessing a first set of one or more components of the processing layer, the first set of one or more components comprising an ingest task definition component, a source element, a sink element and an extractor element; and
  (ii) one or more task execution application programming interfaces for accessing a second set of one or more components of the processing layer, the second set of one or more components comprising an execution framework, a task scheduling element, a monitoring element and a status element; and
wherein the ingestion manager, ingestion engines and analytics platform are implemented by one or more processing devices each comprising a processor coupled to a memory.

2. The apparatus of claim 1 wherein two or more of the analytics workspaces of the analytics platform are configured to receive data from respective potentially disjoint subsets of the ingestion engines under the control of the ingestion manager.

3. The apparatus of claim 1 wherein the ingestion manager is configured to implement data-as-a-service functionality for the plurality of analytics workspaces of the analytics platform.

4. The apparatus of claim 1 wherein the ingestion manager is configured to select the one or more ingestion engines for providing data to the plurality of analytics workspaces of the analytics platform based at least in part on one or more of data type, data volume, data latency, intended usage, and service level agreement requirements.

5. The apparatus of claim 1 wherein the ingestion manager is configured to maintain historical information relating to data usage in the plurality of analytics workspaces of the analytics platform and to adjust the selection of one or more of the ingestion engines for providing data to the plurality of analytics workspaces based at least in part on the historical information.

6. The apparatus of claim 1 wherein the ingestion manager is configured to monitor usage of ingested data in the plurality of analytics workspaces of the analytics platform, to identify related data responsive to the monitoring, and to control ingestion of the related data by the plurality of analytics workspaces.

7. The apparatus of claim 1 wherein the ingestion manager is configured to permit two or more of the analytics workspaces to register to receive data from respective potentially disjoint subsets of the ingestion engines.

8. The apparatus of claim 1 wherein the ingestion manager is configured to control the ingestion of data into operational data containers that are accessible to each of at least a subset of the analytics workspaces of the analytics platform.

9. The apparatus of claim 1 wherein the ingestion manager is configured to ensure compliance with service level agreements for data ingestion on behalf of the plurality of analytics workspaces of the analytics platform.

10. The apparatus of claim 1 wherein the ingestion manager is configured to control enforcement of one or more specified policies relating to ingestion of data on behalf of the plurality of analytics workspaces of the analytics platform.

11. The apparatus of claim 1 wherein the ingestion manager is configured to identify relationships between ingested data sets and to create linkages between the data sets based at least in part on the identified relationships.

12. The apparatus of claim 1 wherein the ingestion manager is configured to audit placement of data received by the plurality of analytics workspaces of the analytics platform from the ingestion engines.

13. The apparatus of claim 1 wherein the ingestion manager is configured for one or more of the following:

to orchestrate one or more characteristics of a data ingestion process implemented by at least one of the ingestion engines;
to select one or more of the ingestion engines for providing data to the plurality of analytics workspaces based at least in part on data transformation or data quality improvement capabilities of the one or more ingestion engines; and
to provide one or more data ingestion functions not provided by one or more of the ingestion engines.

14. A method comprising:
associating a plurality of ingestion engines with an ingestion manager; and
controlling in the ingestion manager receipt of data by an analytics platform from the ingestion engines, the analytics platform comprising a plurality of analytics workspaces;
wherein controlling receipt of data by the analytics platform from the ingestion engines comprises interacting with one or more of the ingestion engines in conjunction with providing data to the plurality of analytics workspaces of the analytics platform;
wherein the ingestion manager is configured to select different subsets of the ingestion engines for providing data to different ones of the analytics workspaces, and to automatically modify its selection of one or more of the subsets of the ingestion engines selected for use with the different ones of the analytics workspaces based at least in part on monitored usage of data in those analytics workspaces;
wherein the ingestion manager selects a first subset of the plurality of ingestion engines for providing data to a first one of the analytics workspaces and selects a second subset of the plurality of ingestion engines for providing data to a second one of the analytics workspaces, the second subset being different than the first subset;
wherein the ingestion manager further implements a processing layer that augments at least one designated ingestion process of a selected one of the ingestion engines relating to ingestion of data into a corresponding one of the analytics workspaces from multiple related sources;
wherein the ingestion manager comprises an ingestion manager web portal providing web-based user access to:
  (i) one or more ingest configuration application programming interfaces for accessing a first set of one or more components of the processing layer, the first set of one or more components comprising an ingest task definition component, a source element, a sink element and an extractor element; and
  (ii) one or more task execution application programming interfaces for accessing a second set of one or more components of the processing layer, the second set of one or more components comprising an execution framework, a task scheduling element, a monitoring element and a status element; and
wherein the associating and controlling are performed by at least one processing device comprising a processor coupled to a memory.

15. The method of claim 14 wherein controlling receipt of data by the analytics platform from the ingestion engines further comprises:
maintaining historical information relating to data usage in the plurality of analytics workspaces of the analytics platform; and
adjusting selection of one or more of the ingestion engines for providing data to the plurality of analytics workspaces based at least in part on the historical information.

16. The method of claim 15 wherein controlling receipt of data by the analytics platform from the ingestion engines further comprises at least one of:
permitting two or more of the analytics workspaces to register to receive data from respective potentially disjoint subsets of the ingestion engines;
controlling the ingestion of data into operational data containers that are accessible to each of at least a subset of the analytics workspaces;
ensuring compliance with service level agreements for data ingestion on behalf of the plurality of analytics workspaces;
controlling enforcement of one or more specified policies relating to ingestion of data on behalf of the plurality of analytics workspaces of the analytics platform;
identifying relationships between ingested data sets and creating linkages between the data sets based at least in part on the identified relationships; and
auditing placement of data received by the plurality of analytics workspaces of the analytics platform from the ingestion engines.

17. The method of claim 14 wherein the ingestion manager is configured to select the one or more ingestion engines for providing data to the plurality of analytics workspaces of the analytics platform based at least in part on one or more of data type, data volume, data latency, intended usage, and service level agreement requirements.

18. A computer program product comprising a non-transitory processor-readable storage medium having one or more software programs embodied therein, wherein the one or more software programs when executed by at least one processing device causes said at least one processing device:
to associate a plurality of ingestion engines with an ingestion manager; and
to control in the ingestion manager receipt of data by an analytics platform from the ingestion engines, the analytics platform comprising a plurality of analytics workspaces;
wherein controlling receipt of data by the analytics platform from the ingestion engines comprises interacting with one or more of the ingestion engines in conjunction with providing data to the plurality of analytics workspaces of the analytics platform;
wherein the ingestion manager is configured to select different subsets of the ingestion engines for providing data to different ones of the analytics workspaces, and to automatically modify its selection of one or more of the subsets of the ingestion engines selected for use with the different ones of the analytics workspaces based at least in part on monitored usage of data in those analytics workspaces;
wherein the ingestion manager selects a first subset of the plurality of ingestion engines for providing data to a first one of the analytics workspaces and selects a second subset of the plurality of ingestion engines for providing data to a second one of the analytics workspaces, the second subset being different than the first subset;
wherein the ingestion manager further implements a processing layer that augments at least one designated ingestion process of a selected one of the ingestion engines relating to ingestion of data into a corresponding one of the analytics workspaces from multiple related sources; and wherein the ingestion manager comprises an ingestion manager web portal providing web-based user access to:
  (i) one or more ingest configuration application programming interfaces for accessing a first set of one or more components of the processing layer, the first set of one or more components comprising an ingest task definition component, a source element, a sink element and an extractor element; and
  (ii) one or more task execution application programming interfaces for accessing a second set of one or more components of the processing layer, the second set of one or more components comprising an execution framework, a task scheduling element, a monitoring element and a status element.

19. The computer program product of claim 18 wherein controlling receipt of data by the analytics platform from the ingestion engines further comprises:
  maintaining historical information relating to data usage in the plurality of analytics workspaces of the analytics platform; and
  adjusting selection of one or more of the ingestion engines for providing data to the plurality of analytics workspaces based at least in part on the historical information.

20. The computer program product of claim 18 wherein controlling receipt of data by the analytics platform from the ingestion engines further comprises at least one of:
  permitting two or more of the analytics workspaces to register to receive data from respective potentially disjoint subsets of the ingestion engines;
  controlling the ingestion of data into operational data containers that are accessible to each of at least a subset of the analytics workspaces;
  ensuring compliance with service level agreements for data ingestion on behalf of the plurality of analytics workspaces;
  controlling enforcement of one or more specified policies relating to ingestion of data on behalf of the plurality of analytics workspaces of the analytics platform;
  identifying relationships between ingested data sets and creating linkages between the data sets based at least in part on the identified relationships; and
  auditing placement of data received by the plurality of analytics workspaces of the analytics platform from the ingestion engines.

21. The computer program product of claim 18 wherein the ingestion manager is configured to select the one or more ingestion engines for providing data to the plurality of analytics workspaces of the analytics platform based at least in part on one or more of data type, data volume, data latency, intended usage, and service level agreement requirements.

* * * * *